(12) United States Patent
Tomomizu et al.

(10) Patent No.: US 8,501,325 B2
(45) Date of Patent: *Aug. 6, 2013

(54) CHARGING MEMBER, PROCESS CARTRIDGE, AND ELECTROPHOTOGRAPHIC APPARATUS

(75) Inventors: Yuya Tomomizu, Suntou-gun (JP); Noriaki Kuroda, Suntou-gun (JP); Noriko Nagamine, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,200

(22) Filed: Feb. 10, 2012

(65) Prior Publication Data

US 2012/0141160 A1 Jun. 7, 2012

Related U.S. Application Data

(63) Continuation of application No. PCT/JP2011/004993, filed on Sep. 6, 2011.

(30) Foreign Application Priority Data

Sep. 27, 2010 (JP) .................. 2010-215809

(51) Int. Cl.
*G03G 15/02* (2006.01)

(52) U.S. Cl.
USPC ............ 428/451; 399/111; 399/176; 428/447

(58) Field of Classification Search
USPC .......................... 399/111, 176; 428/447, 451
See application file for complete search history.

(56) References Cited

U.S. PATENT DOCUMENTS

| | | | |
|---|---|---|---|
| 7,664,434 B2 | 2/2010 | Kuroda et al. | |
| 7,693,457 B2 | 4/2010 | Kuruma et al. | |
| 7,962,068 B2 | 6/2011 | Kuroda et al. | |
| 8,064,803 B2 | 11/2011 | Kuroda et al. | |

(Continued)

FOREIGN PATENT DOCUMENTS

| | | |
|---|---|---|
| JP | 2001-173641 A | 6/2001 |
| JP | 2006-39286 A | 2/2006 |

(Continued)

OTHER PUBLICATIONS

PCT International Search Report of the International Searching Authority, International Application No. PCT/JP2011/004993, Mailing Date Oct. 4, 2011.

(Continued)

*Primary Examiner* — D. S. Nakarani

(74) *Attorney, Agent, or Firm* — Fitzpatrick, Cella, Harper & Scinto

(57) ABSTRACT

Provided is a charging member provided with a surface layer capable of suppressing the bleeding of a low-molecular weight component from an elastic layer with improved reliability. The charging member comprises a support, an elastic layer, and a surface layer, and the surface layer contains a polymer having an Si—O—Ta bond and having a structural unit represented by the following structural formula (1) and a structural unit represented by the following structural formula (2).

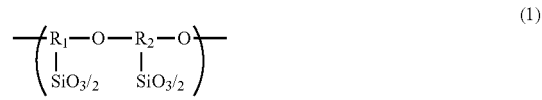

(1)

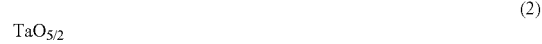

(2)

7 Claims, 5 Drawing Sheets

U.S. PATENT DOCUMENTS

| | | |
|---|---|---|
| 8,092,358 B2 | 1/2012 | Kuruma et al. |
| 2010/0226684 A1 | 9/2010 | Mayuzumi et al. |
| 2011/0182618 A1 | 7/2011 | Kuruma et al. |
| 2011/0217072 A1 | 9/2011 | Kuroda et al. |
| 2012/0076535 A1 | 3/2012 | Nagamine et al. |
| 2012/0076924 A1 | 3/2012 | Mayuzumi et al. |
| 2012/0082481 A1 | 4/2012 | Nagamine et al. |
| 2012/0093539 A1 | 4/2012 | Nagamine et al. |
| 2012/0107565 A1 | 5/2012 | Kuroda et al. |
| 2012/0121296 A1 | 5/2012 | Kuroda et al. |
| 2012/0134709 A1 | 5/2012 | Kuroda et al. |
| 2012/0141159 A1 | 6/2012 | Nagamine et al. |

FOREIGN PATENT DOCUMENTS

| | | |
|---|---|---|
| JP | 2007-4102 A | 1/2007 |
| JP | 2007-225998 A | 9/2007 |
| JP | 2007-264611 A | 10/2007 |
| WO | 2011/080906 A1 | 7/2011 |

OTHER PUBLICATIONS

PCT International Preliminary Report on Patentability and Written Opinion of the International Searching Authority, International Application No. PCT/JP2011/004993, Mailing Date Apr. 11, 2013.

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2011/004993, filed Sep. 6, 2011, which claims the benefit of Japanese Patent Application No. 2010-215809, filed Sep. 27, 2010.

BACKGROUND OF THE INVENTION

1. Field of the Invention

The present invention relates to a charging member to be used in an electrophotographic apparatus, and to a process cartridge and an electrophotographic apparatus each using the charging member.

2. Description of the Related Art

A charging member for charging an electrophotographic photosensitive member by abutting the photosensitive member is generally formed so as to have a rubber-containing elastic layer for securing a nip width between the photosensitive member and the charging member. As such elastic layer typically contains a low-molecular weight component, the low-molecular weight component may bleed to the surface of the charging member to adhere to the surface of the photosensitive member owing to long-term use. In addition, streak-like unevenness may appear in an electrophotographic image formed with the photosensitive member to which the low-molecular weight component has adhered.

In addition, such phenomenon occurs particularly remarkably when an electrophotographic image is formed with an electrophotographic apparatus left in a stop state under a high-temperature, high-humidity environment over a long time period.

To cope with such bleeding of a low-molecular weight component in an elastic layer, Japanese Patent Application Laid-Open No. 2001-173641 discloses a charging roll having an elastic layer whose peripheral surface is coated with an organic-inorganic hybrid coating so that the bleeding of a low-molecular weight component to its surface may be suppressed.

The inventors of the present invention have conducted investigations on the charging roll provided with the organic-inorganic hybrid coating described in Japanese Patent Application Laid-Open No. 2001-173641, and as a result, have found that the organic-inorganic hybrid coating has a small crosslink density. This is probably because emphasis is placed on the flexibility of the organic-inorganic hybrid coating. Accordingly, the inventors have acknowledged that the thickness of the organic-inorganic hybrid coating must be submicrons or more in order that the bleeding of the low-molecular weight component may be suppressed with reliability.

Here, the thickness of the surface layer of the charging member is preferably as small as possible from the viewpoint of charging efficiency. The thickness of the surface layer is preferably as small as possible from the viewpoint of the formation of a surface layer having a uniform thickness as well.

SUMMARY OF THE INVENTION

In view of the foregoing, the present invention is directed to provide a charging member provided with a surface layer capable of suppressing the bleeding of a low-molecular weight component from an elastic layer with improved reliability. Further, the present invention is directed to provide a process cartridge and an electrophotographic apparatus capable of stably forming high-quality electrophotographic images.

According to one aspect of the present invention, there provided a charging member, comprising: a support; an elastic layer; and a surface layer, wherein the surface layer contains a polymer having an Si—O—Ta bond and having a structural unit represented by the following structural formula (1) and a structural unit represented by the following structural formula (2).

(1)

$$TaO_{5/2} \quad (2)$$

(In the structural formula (1), $R_1$ and $R_2$ each independently represent any one of structural formulae (3) to (6).)

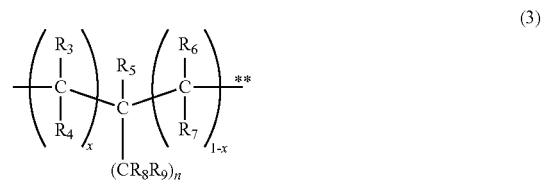
(3)

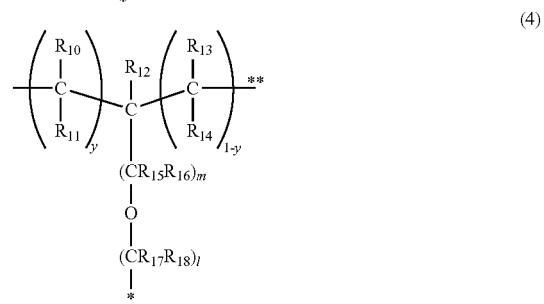
(4)

(5)

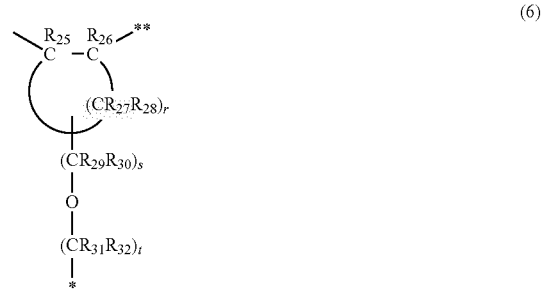
(6)

(In the structural formulae (3) to (6), $R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms; $R_{21}$, $R_{22}$, $R_{27}$, and $R_{28}$ each independently represent hydrogen, oxygen, an alkoxy group having 1 to 4 carbon atoms, or an alkyl group having 1 to 4 carbon atoms; n, m, l, q, s, and t each independently represent an integer of from 1 to 8; p and r each independently represent an integer of from 4 to 12; x and y each independently represent 0 or 1, and a symbol "*" represents a bonding position to a silicon atom in the structural formula (1), and a symbol "**" represents a bonding position to an oxygen atom in the structural formula (1).))

According to another aspect of the present invention, there is provided a process cartridge, comprising: the above-described charging member; and an electrophotographic photosensitive member placed to abut the charging member, wherein the process cartridge is detachably mountable to a main body of an electrophotographic apparatus.

According to further aspect of the present invention, there is provided an electrophotographic apparatus, comprising: the above-described charging member; and an electrophotographic photosensitive member placed to abut the charging member.

A charging member provided with a surface layer capable of suppressing bleeding with improved reliability even when its thickness is small can be obtained. In addition, an electrophotographic apparatus and a process cartridge capable of stably providing high-quality electrophotographic images can be obtained.

DESCRIPTION OF THE EMBODIMENTS

Figure 1:
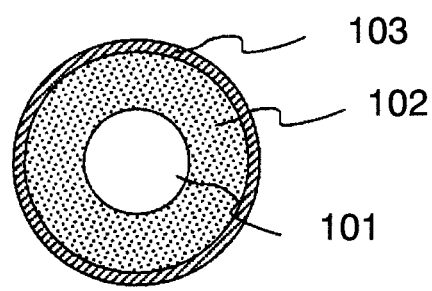
FIG. 1 is a construction view of a charging member according to the present invention.

FIG. 1 is a sectional view in a direction perpendicular to the axis of a charging member (charging roller) having a roller shape according to the present invention. The charging roller has such a structure that an elastic layer 102 and a surface layer 103 are sequentially laminated on a support 101. It should be noted that any other layer may be present between the support and the elastic layer.

Support

A support such as metals including iron, copper, stainless, aluminum, or nickel and alloys thereof can be used as the support.

Elastic Layer

One kind or a combination of two or more kinds of rubbers and thermoplastic elastomers used in the elastic layers of the conventional charging members can each be used as a material for forming the elastic layer. Specific examples of the rubbers are described below. A urethane rubber, a silicone rubber, a butadiene rubber, an isoprene rubber, a chloroprene rubber, a styrene-butadiene rubber, an ethylene-propylene rubber, a polynorbornene rubber, a styrene-butadiene-styrene rubber, an acrylonitrile rubber, an epichlorohydrin rubber, and an alkyl ether rubber.

Examples of the thermoplastic elastomers include a styrene-based elastomer and an olefin-based elastomer. As commercially available products of the styrene-based elastomer, there are specifically given "Rabalon" (trade name) manufactured by Mitsubishi Chemical Corporation and "SEPTON compound" (trade name) manufactured by Kuraray Co., Ltd. Examples of the commercially available products of the olefin-based elastomer are described below. "Thermolan" (trade name) manufactured by Mitsubishi Chemical Corporation, "Milastomer" (trade name) manufactured by Mitsui Chemicals, Inc., "Sumitomo TPE" (trade name) manufactured by Sumitomo Chemical Co., Ltd., and "Santoprene" (trade name) manufactured by Advanced Elastomer Systems Co., Ltd.

The elastic layer is formed so as to have a predetermined conductivity by appropriately using a conductive agent. The electrical resistance of the elastic layer is approximately from $10^2\Omega$ to $10^8\Omega$, in particular, from $10^3$ to $10^6\Omega$. Examples of the conductive agent to be used in the elastic layer include a cationic surfactant, an anionic surfactant, an zwitterionic surfactant, an antistatic agent, and an electrolyte. In addition, the hardness of the elastic layer is preferably 70° or more, more preferably from 73° to 92° in terms of Asker C from the viewpoint of the suppression of the deformation of the charging member when the charging member and a photosensitive member are brought into abutment with each other. The elastic layer which determines the shape of the charging member is preferably of the so-called crown shape that is thicker at the central portion than at each end.

Surface Layer

The surface layer contains a polymer having an Si—O—Ta bond and having a structural unit represented by the following structural formula (1) and a structural unit represented by the following structural formula (2).

(1)

(2)

In the structural formula (1), $R_1$ and $R_2$ each independently represent any one of structural formulae (3) to (6).

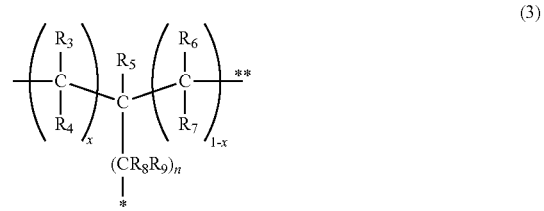

(3)

-continued

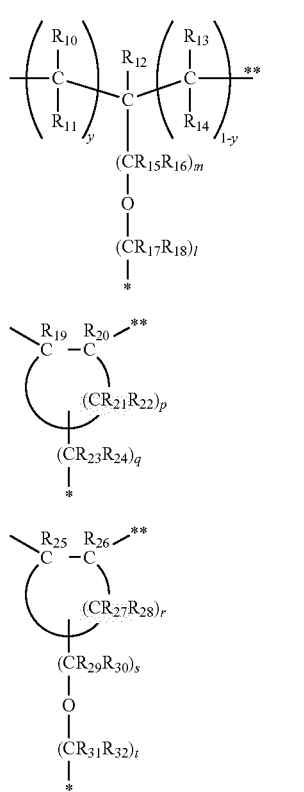

In the structural formulae (3) to (6), $R_3$ to $R_7$, $R_{10}$ to $R_{14}$, $R_{19}$, $R_{20}$, $R_{25}$, and $R_{26}$ each independently represent hydrogen, a linear or branched alkyl group having 1 to 4 carbon atoms, a carbonyl group, a hydroxyl group, a carboxyl group, or an amino group; $R_8$, $R_9$, $R_{15}$ to $R_{18}$, $R_{23}$, $R_{24}$, and $R_{29}$ to $R_{32}$ each independently represent hydrogen or a linear or branched alkyl group having 1 to 4 carbon atoms; $R_{21}$, $R_{22}$, $R_{27}$, and $R_{28}$ each independently represent hydrogen, oxygen, an alkoxy group having 1 to 4 carbon atoms, or a linear or branched alkyl group having 1 to 4 carbon atoms; n, m, l, q, s, and t each independently represent an integer of from 1 to 8; p and r each independently represent an integer of from 4 to 12; x and y each independently represent 0 or 1, and a symbol "*" represents a bonding position to a silicon atom in the structural formula (1), and a symbol "**" represents a bonding position to an oxygen atom in the structural formula (1).

Figure 7A:
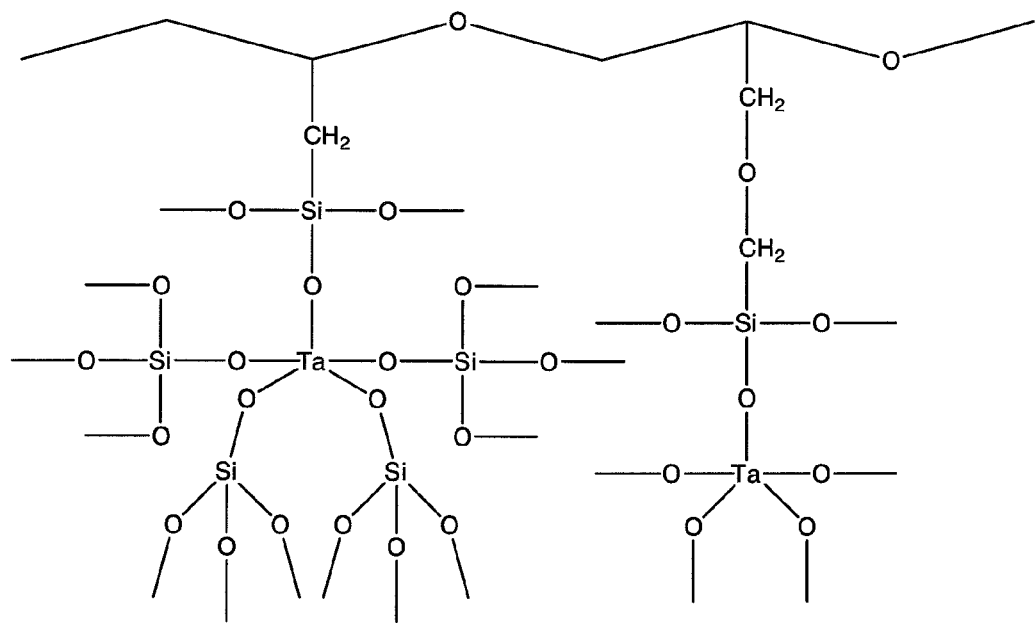
FIG. 7A is a view illustrating the chemical structure of a polymer according to the present invention.
Figure 7B:
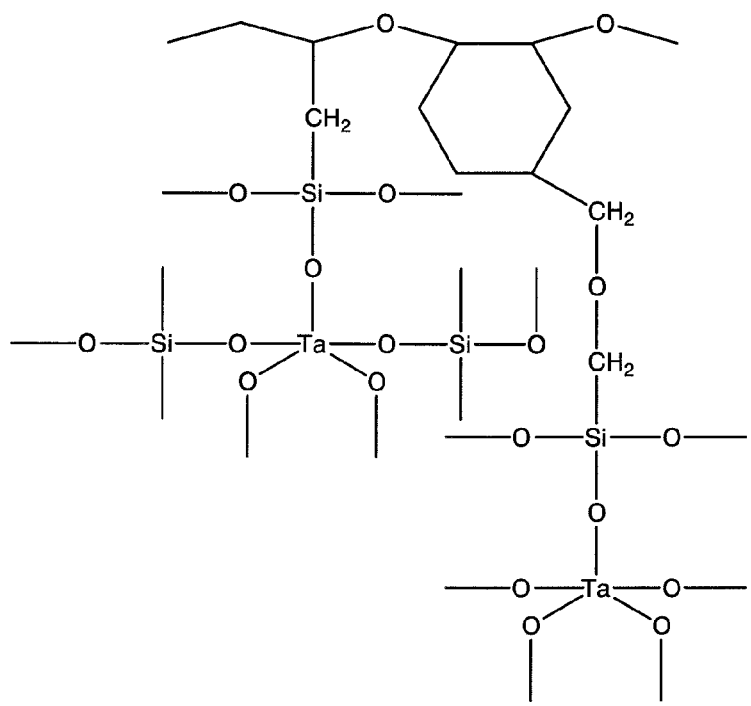
FIG. 7B is a view illustrating the chemical structure of a polymer according to the present invention.

FIG. 7A illustrates, as an example of the polymer, part of a structure when $R_1$ in the structural formula (1) is represented by the structural formula (3) and $R_2$ therein is represented by the structural formula (4). In addition, FIG. 7B illustrates, as an example of the polymer, part of a structure when $R_1$ in the structural formula (1) is represented by the structural formula (3) and $R_2$ therein is represented by the structural formula (6).

The polymer has an extremely dense crosslinked structure because the polymer has an Si—O—Ta bond as well as such a structure that a siloxane bohd and an organic chain moiety bonded to a silicon atom polymerize with each other. Accordingly, the surface layer containing such polymer can suppress bleeding to a high degree even when its thickness is small.

In the structural formula (1) of the polymer, it is preferred that $R_1$ and $R_2$ each independently represent any one selected from structures represented by the following structural formulae (7) to (10). When $R_1$ and $R_2$ each represent any such structure, the surface layer can be additionally tough and additionally excellent in durability. In particular, a structure including an ether group represented by the following structural formula (8) or (10) can additionally improve the adhesiveness of the surface layer for the elastic layer.

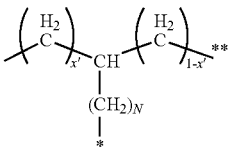

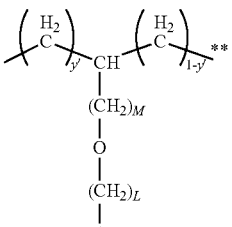

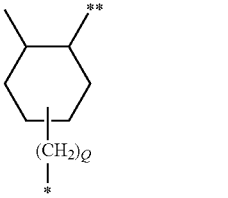

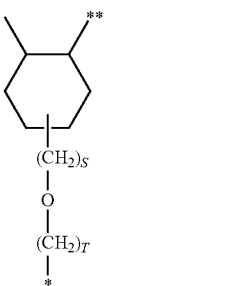

In the structural formulae (7) to (10), N, M, L, Q, S, and T each independently represent an integer of from 1 to 8; x' and y' each independently represent 0 or 1; and a symbol "*" represents a bonding position to a silicon atom in the structural formula (1), and a symbol "**" represents a bonding position to an oxygen atom in the structural formula (1).

A ratio (Ta/Si) between the numbers of tantalum atoms and silicon atoms in the polymer is preferably from 0.1 to 5.0. When the ratio Ta/Si falls within the numerical range, the embrittlement of the polymer can be suppressed. As a result, the surface layer containing such polymer can not only suppress the bleeding of the low-molecular weight component from the elastic layer with improved reliability but also be excellent in durability.

The polymer according to the present invention, which is a crosslinked product, can be obtained by: subjecting a hydrolyzable silane compound represented by the following structural formula (11) and a hydrolyzable tantalum compound represented by the following structural formula (12) to dehydration condensation to obtain a hydrolyzed condensate; and subjecting a radically polymerizable group which the hydrolyzed condensate has such as an epoxy group to a reaction to form a crosslink. The condensation can be performed by mixing those hydrolyzable compounds and appropriately heating the mixture.

$$R_{33}\text{—Si}(OR_{34})(OR_{35})(OR_{36}) \quad (11)$$

$$Ta(OR_{37})(OR_{38})(OR_{39})(OR_{40})(OR_{41}) \quad (12)$$

In the structural formula (11), $R_{33}$ represents any one selected from structures represented by the following structural formulae (13) to (16), and $R_{34}$ to $R_{36}$ each independently represent an alkyl group having 1 to 4 carbon atoms. In the structural formula (12), $R_{37}$ to $R_{41}$ each independently represents an alkyl group having 1 to 9 carbon atoms.

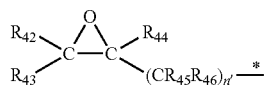
(13)

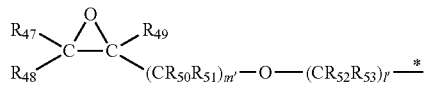
(14)

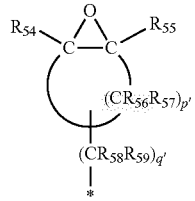
(15)

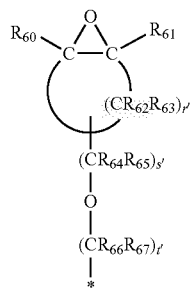
(16)

In the structural formulae (13) to (16), $R_{42}$ to $R_{44}$, $R_{47}$ to $R_{49}$, $R_{54}$, $R_{55}$, $R_{60}$, and $R_{61}$ each independently represent hydrogen, a linear or branched alkyl group having 1 to 4 carbon atoms, a hydroxyl group, a carbonyl group, a carboxyl group, a chlorocarbonyl group, or an amino group; $R_{45}$, $R_{46}$, $R_{50}$ to $R_{53}$, $R_{58}$, $R_{59}$, and $R_{64}$ to $R_{67}$ each independently represent hydrogen, or a linear or branched alkyl group having 1 to 4 carbon atoms; $R_{56}$, $R_{57}$, $R_{62}$, and $R_{63}$ each independently represent hydrogen, an alkoxyl group having 1 to 4 carbon atoms, or a linear or branched alkyl group having 1 to 4 carbon atoms; $CR_{45}R_{46}$, $CR_{50}R_{51}$, $CR_{52}R_{53}$, $CR_{58}R_{59}$, $CR_{64}R_{65}$, and $CR_{66}R_{67}$ may represent carbonyl groups; at least two of the carbon atoms in $R_{42}$, $R_{43}$, $R_{44}$, or $(CR_{45}R_{46})_{n'}$ and at least two of the carbon atoms in $R_{47}$, $R_{48}$, $R_{49}$, or $(CR_{50}OR_{51})_{m'}$ may collaborate with each other to form a cycloalkane; $R_{54}$ and $R_{55}$, or $R_{60}$ and $R_{61}$ may collaborate with each other to form a cycloalkane; n', m', l', q', s', and t' each independently represent an integer of from 1 to 8; p' and r' each independently represent an integer of from 4 to 12; and a symbol "*" represents a bonding position to a silicon atom in the structural formula (11).

The polymer is preferably a crosslinked product of a hydrolyzed condensate of hydrolyzable compounds represented by the structural formulae (11) and (12), and a hydrolyzable silane compound represented by the following structural formula (17). Such crosslinked product can improve the solubility and coating performance of each of the formulae (11) and (12) at a synthesis stage, and electrical characteristics as the physical properties of the film after its curing. In particular, the case where $R_{68}$ represents an alkyl group having 1 to 21 carbon atoms is preferred in terms of the improvements of the solubility and coating performance. In addition, the case where $R_{68}$ represents a phenyl group is preferred because the polymer contributes to the improvements of the electrical characteristics, in particular, a volume resistivity.

$$R_{68}\text{—Si}(OR_{69})(OR_{70})(OR_{71}) \quad (17)$$

In the formula (17), $R_{68}$ represents an alkyl group having 1 to 21 carbon atoms or a phenyl group, and $R_{69}$ to $R_{71}$ each independently represent an alkyl group having 1 to 6 carbon atoms. In addition, when the polymer contains a hydrolyzable silane compound in which $R_{68}$ represents a phenyl group, the compound is preferably used in combination with a hydrolyzable silane compound in which $R_{68}$ represents an alkyl group having 1 to 21 carbon atoms because the compound shows good compatibility with a solvent even when its structure changes through a hydrolysis condensation reaction.

The polymer, which is a crosslinked product, can be obtained by: preparing a paint for forming a surface layer containing such hydrolyzed condensate; applying the paint to form a coating film; and performing a crosslinking reaction after the formation.

The paint for forming a surface layer can be prepared by the following steps.

Step (1)

A hydrolyzable silane compound (A) represented by the formula (11), a hydrolyzable silane compound (B) represented by the formula (17), and a hydrolyzable tantalum compound (C) represented by the formula (12) as monomers are prepared.

Step (2)

The hydrolyzable silane compound (A) and the hydrolyzable silane compound (B) are mixed, and then water (D) and an alcohol (E) are added to the mixture. The resultant is subjected to hydrolysis and condensation by reflux under heat. Thus, a condensate of the hydrolyzable silane compounds is obtained.

Step (3)

The hydrolyzable tantalum compound (C) is added and mixed into the resultant solution, and then the mixture is subjected to hydrolysis and condensation by being appropriately heated so that a condensate of the hydrolyzable silane compounds and the hydrolyzable tantalum compound (also referred to as "silane-tantalum condensate") may be produced. Thus, a condensate-containing solution is obtained.

Step (4)

A photopolymerization initiator (G) is added and mixed into the condensate-containing solution.

In the step (2), the hydrolyzable silane compound (B) has only to be used as required. In addition, the step (3) can be omitted by adding the hydrolyzable tantalum compound (C) simultaneously with, for example, the hydrolyzable compound (A).

Hereinafter, each of the step (1), the step (2), and the step (4) is described in detail.

Step (1)

Specific examples of the hydrolyzable silane compound (A) are described below. One kind of those compounds can be used, or two or more kinds thereof can be used in combination.

4-(1,2-Epoxybutyl)trimethoxysilane, 5,6-epoxyhexyltriethoxysilane, 8-oxirane-2-yloctyltrimethoxysilane, 8-oxirane-2-yloctyltriethoxysilane, 3-glycidoxypropyltrimethoxysilane, 3-glycidoxypropyltriethoxysilane, 1-(3,4- epoxycyclohexyl)ethyltrimethoxysilane, 1-(3,4-epoxycyclohexyl)ethyltriethoxysilane, 3-(3,4-epoxycyclohexyl)methyloxypropyltrimethoxysilane, and 3-(3,4-epoxycyclohexyl)methyloxypropyltriethoxysilane.

Specific examples of the hydrolyzable silane compound (B) are described below. One kind of those compounds can be used, or two or more kinds thereof can be used in combination.

Methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, hexyltrimethoxysilane, hexyltriethoxysilane, hexyltripropoxysilane, decyltrimethoxysilane, decyltriethoxysilane, decyltripropoxysilane, phenyltrimethoxysilane, phenyltriethoxysilane, and phenyltripropoxysilane.

Specific examples of the hydrolyzable tantalum compound (C) are described below. One kind of those compounds can be used, or two or more kinds thereof can be used in combination.

Tantalum pentamethoxide, tantalum pentaethoxide, tantalum penta-n-propoxide, tantalum penta-1-propoxide, tantalum n-butoxide, tantalum t-butoxide, and tantalum phenoxide.

A usage ratio in terms of a molar ratio among the hydrolyzable silane compound (A), the hydrolyzable silane compound (B), and the hydrolyzable tantalum compound (C) preferably satisfies a formula (20).

$$0.1 \leq C/(A+B) \leq 5.0 \quad (20)$$

In the formula (20): A represents the number of moles of the hydrolyzable silane compound (A) represented by the formula (11); B represents the number of moles of the hydrolyzable silane compound (B) represented by the formula (17); and C represents the number of moles of the hydrolyzable tantalum compound (C) represented by the formula (12).

In addition, a surface layer having a high crosslink density and a high suppressing effect on bleeding can be obtained as long as the value for the ratio C/(A+B) is 0.1 or more. As long as the value is 5.0 or less, the occurrence of opacification or precipitation in the paint for forming a surface layer is suppressed, and hence its storage stability can be improved. The usage ratio more preferably satisfies a formula (21).

$$0.5 \leq C/(A+B) \leq 3.0 \quad (21)$$

Step (2)
The addition amount of the water (D) to be added is preferably such that a ratio Ror (D/(A+B)) of the number of moles D of the water to the total number of moles (A+B) of the hydrolyzable silane compounds (A) and (B) is from 0.3 to 6.0. The Ror is more preferably from 1.2 to 3.0.

As long as the Ror is 0.3 or more, the condensation reaction is sufficiently performed, and hence the remaining of an unreacted monomer is suppressed. Accordingly, a film having a high crosslink density is obtained. As long as the Ror is 6.0 or less, the rate of the condensation reaction is high, and hence the occurrence of opacification or precipitation in the paint for forming a surface layer can be suppressed. In addition, a reduction in compatibility with the condensate due to raised polarity can be suppressed. The alcohol (E) is used for making the silane-tantalum condensate compatible.

There may be preferably used, as the alcohol (E), a primary alcohol, a secondary alcohol, a tertiary alcohol, a mixture of a primary alcohol and a secondary alcohol, or a mixture of a primary alcohol and a tertiary alcohol. A mixed solution of ethanol, methanol, and 2-butanol, or a mixed solution of ethanol and 2-butanol is particularly preferred as the alcohol in terms of the compatibility with the condensate and coating performance.

Step (4)
The photopolymerization initiator (G) is used for crosslinking the silane-tantalum condensate. An onium salt of a Lewis acid or of a Bronsted acid, or a cationic polymerization catalyst can also be used as the photopolymerization initiator (G). Examples of the cationic polymerization catalyst include a borate, an imide compound, a triazine compound, an azo compound, and a peroxide.

As the cationic polymerization catalyst, an aromatic sulfonium salt and an aromatic iodonium salt are preferred from the viewpoints of sensitivity, stability, and reactivity. Examples of the particularly preferred cationic polymerization catalyst may include a bis(4-tert-butylphenyl)iodonium salt, and a compound represented by a formula (18) (trade name: Adekaoptomer SP150, manufactured by ADEKA CORPORATION).

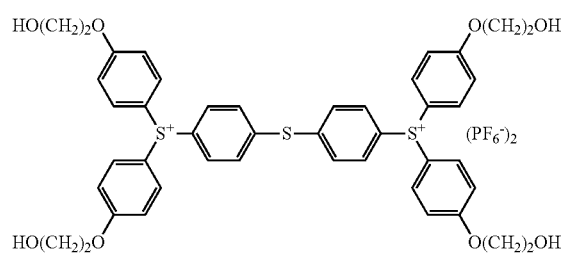

(18)

In addition, a compound represented by a formula (19) (trade name: IRGACURE 261, manufactured by Ciba Specialty Chemicals Inc.) can also be suitably used.

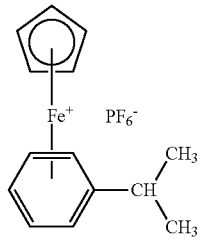

(19)

The photopolymerization initiator (G) is preferably dissolved in a solvent such as an alcohol or a ketone, for example, methanol or methyl isobutyl ketone in advance before use in order that its compatibility with the paint for forming a surface layer may be improved.

Further, the paint for forming a surface layer is adjusted with a solvent so as to have a concentration suitable for coating in order to improve coating property. Examples of the solvent to be used may include alcohols such as ethanol, methanol, and 2-butanol, and ketones such as ethyl acetate, methyl ethyl ketone, and methyl isobutyl ketone. Those alcohols and ketones may be used as a mixture. In particular, a mixed solution of ethanol and 2-butanol is preferred.

As the application method of the paint for forming a surface layer, application with a roll coater, immersion application, ring application, or the like can be adopted.

The silane-tantalum condensate is crosslinked in the coating film formed by applying the paint for forming a surface layer onto the elastic layer by the method. A crosslink can be formed by applying an active energy ray to cause the photopolymerization initiator (G) to cleave and polymerize an epoxy group in the silane-tantalum condensate. Ultraviolet light is preferred as an active energy ray to be used because the ultraviolet light can produce a radical of the photopolymerization initiator (G) at a low temperature to progress the crosslinking reaction.

When the crosslinking reaction is progressed at a low temperature, rapid volatilization of the solvent from the coating film is suppressed, and the occurrence of phase separation or a crimp in the coating film is suppressed. Accordingly, a surface layer having a high adhesive strength with the elastic layer can be formed. The occurrence of a crimp or crack in the surface layer having a high adhesive strength with the elastic layer can be suppressed even when the charging member is used under an environment whose temperature and humidity change abruptly and the volume of the elastic layer fluctuates owing to the changes in temperature and humidity. Moreover, reductions in the electrical characteristics of the elastic layer in the production step can be suppressed because the heat deterioration of the elastic layer can be suppressed at the time of the progress of the crosslinking reaction.

As a UV light source, a high-pressure mercury lamp, a metal halide lamp, a low-pressure mercury lamp, an excimer UV lamp, or the like can be used. Of those, a UV light source which provides UV light having a wavelength of from 150 nm to 480 nm is preferred. The integral light quantity of UV light can be adjusted depending on the irradiation time, a lamp output, and a distance between the lamp and a surface layer. In addition, the integral light quantity may be provided with a gradient within the irradiation time. The integral light quantity of UV light can be appropriately selected. The integral light quantity of UV light can be determined from the following equation.

UV integral light quantity(mJ/cm$^2$)=UV light intensity (mW/cm$^2$)×irradiation time(s)

When a low-pressure mercury lamp is used, the integral light quantity of UV light can be measured with a UV integral actinometer "UIT-150-A" or "UVD-S254" (both are trade names) manufactured by USHIO INC. Further, when an excimer UV lamp is used, the integral light quantity of UV light can be measured with a UV integral actinometer "UIT-150-A" or "VUV-S172" (both are trade names) manufactured by USHIO INC.

The thickness of the surface layer thus formed is preferably from 10 nm to 100 nm. The suppressing effect on the bleeding of the low-molecular weight component from the elastic layer can be obtained with improved reliability by setting the thickness within the range. In addition, the application unevenness of the paint for forming a surface layer at the time of the formation of the surface layer is suppressed, and hence a uniform coating film can be formed. In addition, such thickness is preferred in terms of an external appearance and a cost.

A degree of condensation DC of a silane compound in the surface layer is preferably more than 50% and 75% or less when the usage molar ratio among the hydrolyzable silane compound (A), the hydrolyzable silane compound (B), and the hydrolyzable tantalum compound (C) satisfies the formula (20).

Here, the DC is an indicator representing the degree of condensation with respect to all groups bonded to a silicon atom, and is calculated with an equation (22).

$$DC = \frac{n}{4} \times \frac{\sum_{i=1}^{n} \frac{i}{n} \alpha^i}{\sum_{i=0}^{n} \alpha^i} \quad (22)$$

In the equation (22), n represents the number of hydrolyzable functional groups which a hydrolyzable silane compound has, for example, alkoxy groups, and represents 3 in the case of the hydrolyzable silane compound (A) or (B). The DC can be determined from an equation (23) when α is represented by T.

$$DC = \frac{3}{4} \times \frac{\frac{1}{3} \times T^1 + \frac{2}{3} \times T^2 + \frac{3}{3} \times T^3}{T^0 + T^1 + T^2 + T^3} \quad (23)$$

Here, $T^0$ to $T^3$ each represent the amount of such a component that the number of condensed hydrolyzable moieties of the hydrolyzable silane compound is 0 to 3. When the DC exceeds 50%, a dense film having a high suppressing effect on bleeding is obtained. When all the hydrolyzable functional groups of a silane compound in which the number of the functional groups is 3 are condensed, the degree of condensation is 75%. When the degree of condensation exceeds 75%, the paint has so high a viscosity that its application property reduces, or opacification or separation occurs.

Figure 6:
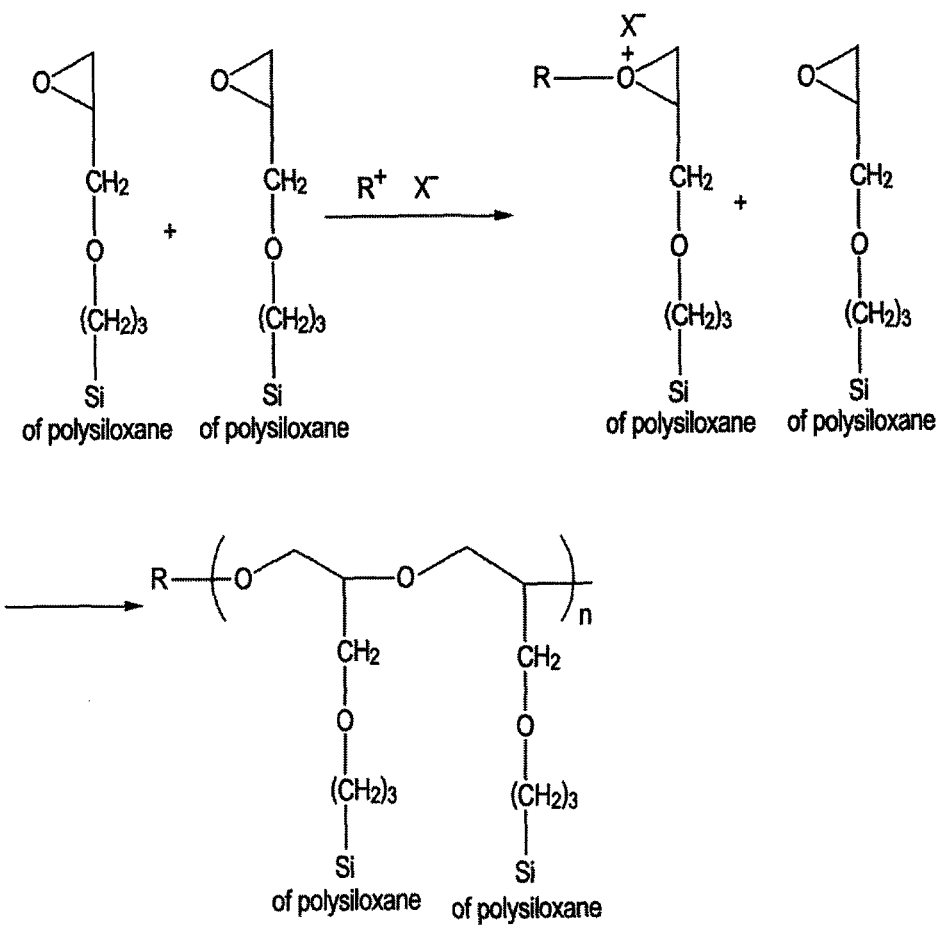
FIG. 6 is an explanatory diagram of a crosslinking reaction in the step of forming a surface layer according to the present invention.

The crosslinking and curing reactions that occur in the process for forming the polymer according to the present invention are described with reference to FIG. 6.

For example, a silane-tantalum condensate obtained by hydrolyzing 3-glycidoxypropyltrimethoxysilane as the component (A) and the hydrolyzable tantalum compound (C) has an epoxy group as a cationically polymerizable group. The epoxy ring of the epoxy group of such silane-tantalum condensate opens in the presence of a cationic polymerization catalyst (represented as "R$^+$X$^-$" in FIG. 6), and hence polymerization proceeds in a chain fashion. As a result, polysiloxane molecules each containing TaO$_{5/2}$ crosslink with each other to cure. Thus, the polymer according to the present invention is formed. It should be noted that n in FIG. 6 represents an integer of 1 or more.

<Electrophotographic Apparatus and Process Cartridge>

Figure 2:
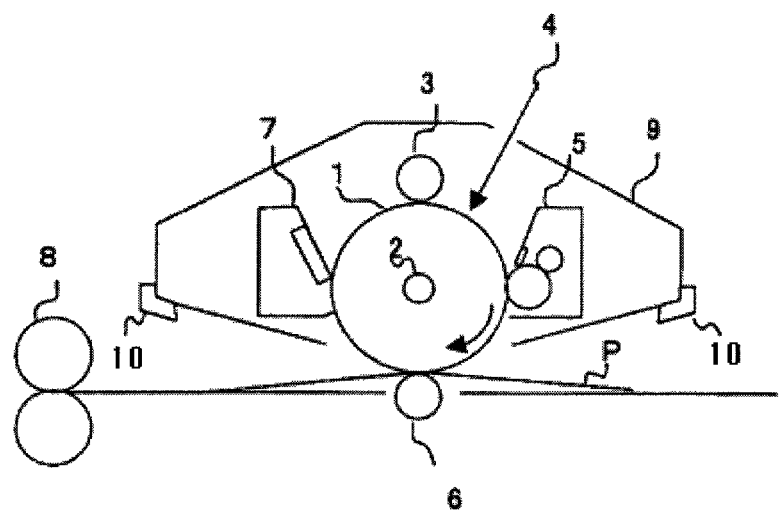
FIG. 2 is a construction view of an electrophotographic apparatus according to the present invention.

FIG. 2 illustrates an example of an electrophotographic apparatus provided with a process cartridge having the charging member according to the present invention. A cylindrical electrophotographic photosensitive member 1 is placed to abut a charging member 3 (roller-shaped charging member in FIG. 2) of the present invention, and is rotationally driven about an axis 2 in the direction indicated by an arrow at a predetermined circumferential speed. The surface of the electrophotographic photosensitive member 1 to be rotationally driven is uniformly charged to a positive or negative predetermined potential by the charging member 3. Next, the surface of the electrophotographic photosensitive member 1 receives exposure light (image exposure light) 4 output from exposing unit (not shown) such as slit exposure or laser beam scanning exposure so that electrostatic latent images corresponding to a target image may be formed.

Upon charging of the surface of the photosensitive member by the charging member, a voltage formed only of a DC voltage or a voltage obtained by superimposing an AC voltage on a DC voltage is applied to the charging member 3 from voltage-applying unit (not shown). In examples to be described later, a voltage (−1,000 V) formed only of a DC voltage was applied to the charging member. In addition, in the examples to be described later, a dark portion potential and a light portion potential were set to −500 V and −150 V, respectively. The electrostatic latent images formed on the surface of the photosensitive member 1 are developed (reversal development or normal development) with toner in the developer of developing unit 5 to turn into toner images. Examples of the developing unit include jumping developing unit, contact developing unit, and magnetic brush unit. Of those, the contact developing unit is preferred from the viewpoint of the alleviation of the scattering property of the toner. In the examples to be described later, the contact developing unit was adopted. The toner images formed on the surface of the electrophotographic photosensitive member 1 are sequentially transferred onto a transfer material P (such as paper) by a transfer bias from transferring unit 6 (such as a transfer roller). The transfer material P is taken out of a transfer material-supplying unit (not shown) and supplied to an abutting portion between the electrophotographic photosensitive member 1 and the transferring unit 6 in synchronization with the rotation of the electrophotographic photosensitive member 1. The transfer material P onto which the toner images have been transferred is separated from the surface of the photosensitive member 1 to be introduced into fixing unit 8, and is then printed out as an image-formed product (print or copy) onto which the toner images have been fixed to the outside of the apparatus. A transfer residual developer (toner) on the surface of the photosensitive member 1 after the transfer of the toner images is removed by a cleaning unit 7 (such as a cleaning blade) so that the surface may be cleaned. Further, the surface is subjected to an antistatic treatment by pre-exposure light (not shown) from a pre-exposing unit (not shown), and is then repeatedly used for image formation. It should be noted that pre-exposure is not necessarily needed when the charging unit is contact charging unit.

A process cartridge of the present invention includes the photosensitive member 1 described above and the charging member 3, and can be formed by integrally bonding any other units selected from, for example, the developing unit 5, the transferring unit 6, and the cleaning unit 7 to the components. In addition, the process cartridge is detachably mountable to the main body of an electrophotographic apparatus such as a copying machine or a laser beam printer. In the electrophotographic apparatus illustrated in FIG. 2, a process cartridge 9 is formed by integrally supporting the electrophotographic photosensitive member 1, the charging member 3, the developing unit 5, and the cleaning unit 7 to turn the components into a cartridge. The cartridge is made removable from the main body of the electrophotographic apparatus with guiding unit 10 such as a rail of the main body of the electrophotographic apparatus.

EXAMPLES

Hereinafter, the present invention is described in more detail by way of specific examples. It should be noted that the term "part(s)" described in the following refers to "part(s) by mass."

Example 1

[1] Preparation and Evaluation of Condensate, and Preparation and Evaluation of Coating Solution <Preparation of Condensate 1>

Components shown in Table 1 below were mixed, and then the mixture was stirred at room temperature for 30 minutes.

TABLE 1

| | |
|---|---|
| Hydrolyzable silane compound: | 11.56 g |
| 3-Glycidoxypropyltrimethoxysilane (GPTMS, | (0.049 mol) |
| hereinafter represented as "EP-1") | |
| (trade name: KBM-403, manufactured by | |
| Shin-Etsu Chemical Co., Ltd.) | |
| Hydrolyzable silane compound: | 62.11 g |
| Hexyltrimethoxysilane (HeTMS, represented | (0.301 mol) |
| as "He" in a table) | |
| (trade name: KBM-3063, manufactured by | |
| Shin-Etsu Chemical Co., Ltd.) | |
| Ethanol (manufactured by KISHIDA CHEMICAL | 91.87 g |
| Co., Ltd., reagent grade) | |
| Ion-exchanged water | 11.34 g |

Subsequently, the mixed components were refluxed under heat with an oil bath at 120° C. for 20 hours. Thus, a condensate intermediate 1 was obtained. The concentration of the condensate intermediate 1 was 28.0 mass % in terms of a solid content (mass ratio with respect to the total weight of the solution when all hydrolyzable silane compounds were assumed to be subjected to dehydration condensation).

Next, the condensate intermediate 1 and a material shown in Table 2 below were mixed, and then the mixture was stirred at room temperature for 3 hours. Thus, a liquid condensate 1 (silane-tantalum condensate) was obtained. The series of stirrings was performed at 750 rpm. The ratio Ta/Si equals 1.00.

TABLE 2

| | |
|---|---|
| Condensate 1 | 98.05 g |
| Tantalum pentaethoxide | 78.75 g |
| (hereinafter represented as "Ta- | (0.194 mol) |
| 1") (manufactured by Gelest) | |

Evaluation 1

(1) Presence or Absence of Si—O—Ta Bond

The condensed state of Ta of the condensate 1 was measured as described below. A condensate 1 to be subjected to the evaluation (hereinafter referred to as "condensate 1 for evaluation") was synthesized as a sample for measurement in the same manner as in the condensate 1 except that the ion-exchanged water used upon synthesis of the condensate intermediate 1 was changed to $^{17}O$—$H_2O$ (7 to 9.9 atm %, manufactured by CIL).

Figure 3:
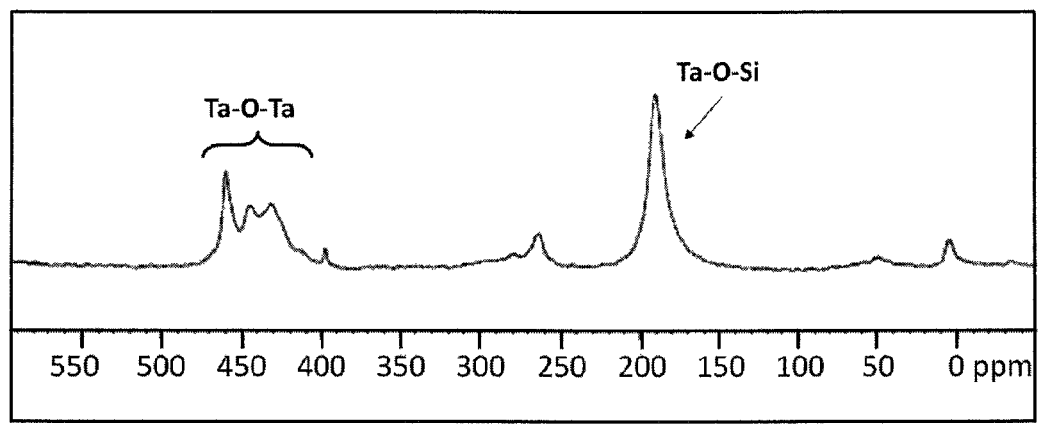
FIG. 3 is the $^{17}$O-NMR spectrum of a condensate prepared in Example 1.

The resultant liquid condensate 1 for evaluation was subjected to $^{17}O$-NMR measurement with a nuclear magnetic resonance apparatus (Avance 500 manufactured by BRUKER). As a result, a reference spectrum having the peak of Si—$^{17}O$—Ta at 170 to 200 ppm and the peak of Ta—$^{17}O$—Ta at 410 to 460 ppm as illustrated in FIG. 3 was obtained. Next, the condensate 1 for evaluation was subjected to $^{17}O$-NMR measurement, and then the presence or absence of an Si—O—Ta bond was detected from the resultant spectrum.

(2) Calculation of Ratio of Number of Ta—O—Ta Bonds to Numbers of Si—O—Ta Bonds and Ta—O—Ta Bonds A ratio of the number of Ta—O—Ta bonds to the numbers of Si—O—Ta bonds and the Ta—O—Ta bonds, i.e., a ratio "(Ta—O—Ta)/{(Si—O—Ta)+(Ta—O—Ta)} was calculated from the integration value of each peak in the $^{17}$O-NMR spectrum of the condensate 1 for evaluation obtained in the evaluation [1] (1).

<Preparation of Coating Solution 1>

2.00 Grams of a 10-mass % solution of an aromatic sulfonium salt (trade name: Adekaoptomer SP-150, manufactured by ADEKA CORPORATION) as a photocationic polymerization initiator in methyl isobutyl ketone was added to 25 g of the condensate 1. Thus, a coating solution 1 was prepared.

Evaluation 2

The coating solution 1 was evaluated for its stability by the following criteria. Table 9 shows the result.

A: The solution is in such a state that no opacification or precipitation occurs even after having been left to stand for one month.

B: The solution is in such a state that opacification slightly occurs after a lapse of about two weeks.

C: The solution is in such a state that opacification slightly occurs after a lapse of about one week.

D: The solution is in such a state that opacification and/or precipitation occur at the time of the synthesis.

Evaluation 3

A cured film of the coating solution 1 was formed by the following procedure, and was then analyzed for its chemical structure. In addition, its degree of condensation (DC %) was calculated.

Figure 4:
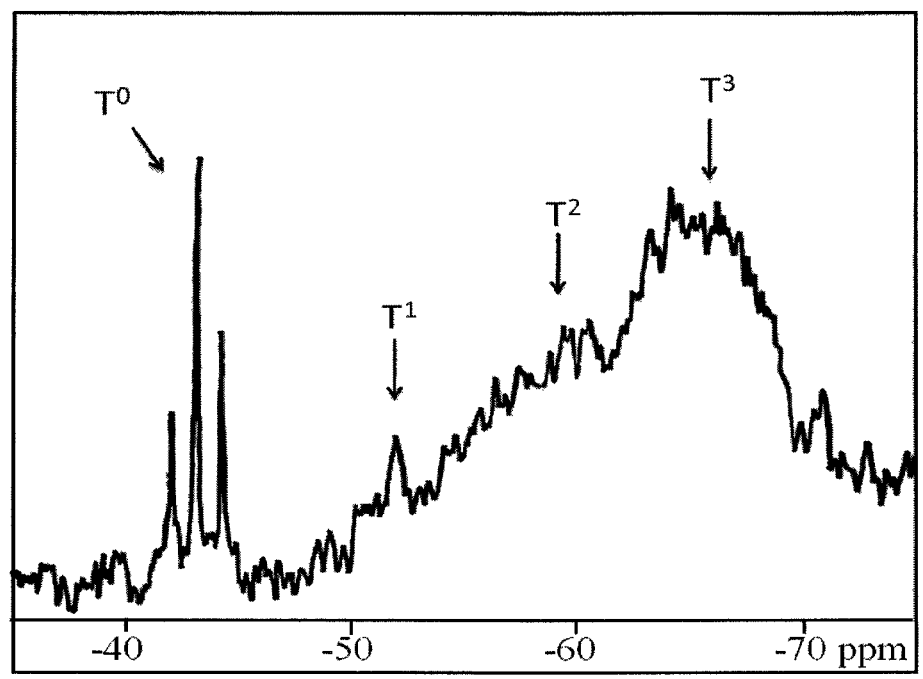
FIG. 4 is the $^{29}$Si-NMR spectrum of a cured film formed of a paint for forming a surface layer prepared in Example 1.

That is, the coating solution 1 was applied onto a defatted aluminum sheet having a thickness of 100 μm. After having been dried, the coating solution 1 was crosslinked and cured by being irradiated with DV light having a wavelength of 254 nm from a low-pressure mercury lamp (manufactured by HARISON TOSHIBA LIGHTING Corporation) so that an integral light quantity was 9,000 mJ/cm$^2$. Thus, the cured film was obtained. The resultant cured film was shaved with a glass plate and pulverized with an agate mortar. Thus, a sample powder for measurement was produced. The $^{29}$Si—NMR spectrum of the sample was measured with a nuclear magnetic resonance apparatus (JMN-EX400, JEOL Ltd.). FIG. 4 illustrates the resultant spectrum data. In the detected spectrum, a peak at −46 to −40 ppm is defined as a $T^0$ component, a peak at −55 to −47 ppm is defined as a $T^1$ component, a peak at −61 to −54 ppm is defined as a $T^2$ component, and a peak at −71 to −61 ppm is defined as a $T^3$ component. Here, the $T^3$ component represents such a state that a silicon atom having one bond with an organic group has three bonds with other silicon atoms or tantalum atoms through oxygen atoms. The degree of condensation of hydrolyzable functional groups bonded to Si was measured from the equation (23) on the basis of those detected values.

Figure 5:
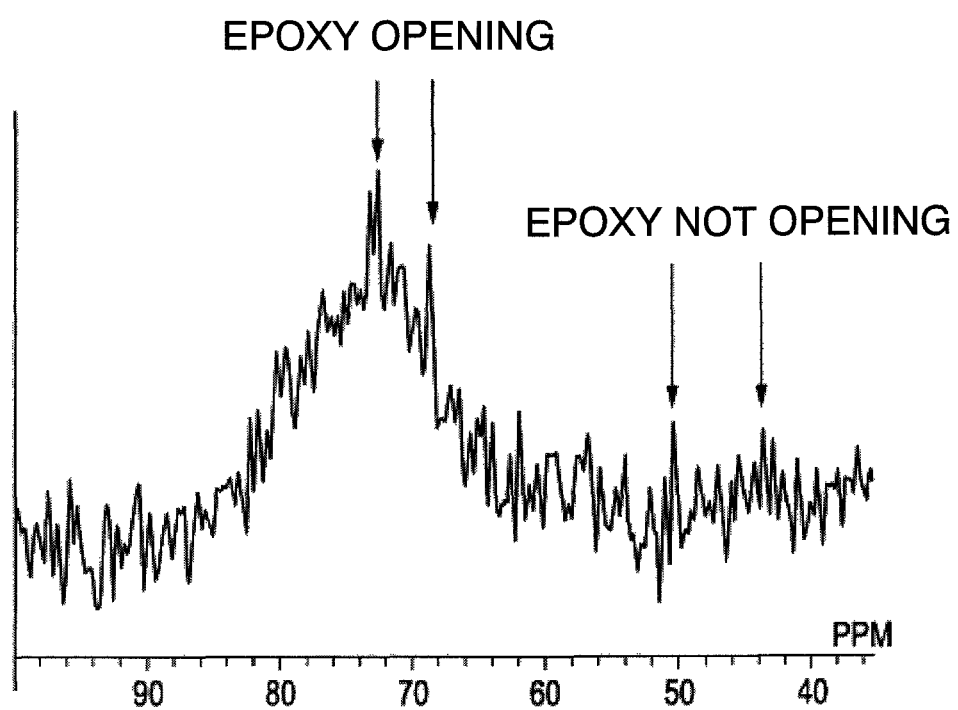
FIG. 5 is the $^{13}$C-NMR spectrum of the cured film formed of the paint for forming a surface layer prepared in Example 1.

In addition, the $^{13}$C-NMR spectrum of the sample was measured. FIG. 5 illustrates the resultant spectrum. It was confirmed from the spectrum that no epoxy group was present in the cured film and all epoxy groups underwent ring opening. It was confirmed from the foregoing that in the cured film formed from the coating solution 1, all epoxy groups in the glycidoxypropylethoxysilane compound as a raw material underwent ring opening and crosslinking, and a structural unit —SiO$_{3/2}$ in the formula (1) was contained. It was able to similarly identify the results of the evaluation 3 in the examples to be described later.

[2] Production of Charging Roller

<Preparation of Paints 1-1 to 1-7 for Forming Surface Layers>

The coating solution 1 was diluted with a mixed solution of ethanol and 2-butanol (ethanol:2-butanol=1:1 (mass ratio)). Thus, paints 1-1 to 1-7 for forming surface layers having solid content concentrations of 1.0 mass %, 0.1 mass %, 0.2 mass %, 0.5 mass %, 3.5 mass %, 4.0 mass %, and 5.0 mass % were prepared.

<Production of Elastic Roller>

TABLE 3

| | |
|---|---|
| Medium high acrylonitrile NBR (trade name: Nipol DN219, central value of a bonded acrylonitrile content: 33.5%, central value of a Mooney viscosity: 27, manufactured by Zeon Corporation) | 100 parts |
| Carbon black for color (filler) (trade name: #7360SB, particle diameter: 28 nm, nitrogen adsorption specific surface area: 77 m$^2$/g, DBP absorption: 87 cm$^3$/100 g, manufactured by TOKAI CARBON CO., LTD.) | 48 parts |
| Calcium carbonate (filler) (trade name: NANOX #30, manufactured by MARUO CALCIUM CO., LTD.) | 20 parts |
| Zinc oxide | 5 parts |
| Stearic acid | 1 parts |

The components shown in Table 3 above were mixed in a 6-L pressure kneader (TD6-15MDX manufactured by TOSHIN CO., LTD.) at a filling ratio of 70 vol % and a blade speed of 30 rpm for 24 minutes. Thus, an unvulcanized rubber composition was obtained. 4.5 Parts of tetrabenzylthiuram disulfide (trade name: Sanceler TBzTD, manufactured by SANSHIN CHEMICAL INDUSTRY CO., LTD.) as a vulcanization accelerator and 1.2 parts of sulfur as a vulcanizing agent were added to 174 parts by mass of the unvulcanized rubber composition. Then, the mixture was bilaterally cut a total of twenty times with open rolls each having a roll diameter of 12 inches at a front roll speed of 8 rpm, a back roll speed of 10 rpm, and a roll interval of 2 mm. After that, the resultant was subjected to tight milling ten times at a roll interval of 0.5 mm. Thus, a kneaded product I for an elastic layer was obtained.

Next, a columnar base made of steel having a diameter of 6 mm and a length of 252 mm (having a nickel-plated surface) was prepared. Then, a thermosetting adhesive containing a metal and a rubber (trade name: METALOC U-20, manufactured by TOYO KAGAKU KENKYUSHO CO., LTD.) was applied to a region extending by up to 115.5 mm on both sides each with respect to the center in the axial direction of the columnar surface of the base (region having a total width in the axial direction of 231 mm). The resultant was dried for 30 minutes at a temperature of 80° C., and was then dried for an additional one hour at a temperature of 120° C. Simultaneously, the kneaded product I was coaxially extruded into a cylindrical shape having an outer diameter of 8.75 to 8.90 mm around the mandrel with an adhesive layer by extrusion molding with a crosshead, and then its ends were cut. Thus, an elastic roller 1 in which an unvulcanized elastic layer was laminated on the outer periphery of the mandrel was produced. An extruder having a cylinder diameter of 70 mm (φ70) and a ratio L/D of 20 was used as an extruder. With regard to temperature regulation at the time of the extrusion, the temperature of the head was set to 90° C., the temperature of the cylinder was set to 90° C., and the temperature of a screw was set to 90° C.

Next, the roller 1 was vulcanized with a continuous heating furnace having two zones set to different temperatures. The roller was passed through a first zone whose temperature had been set to 80° C. in 30 minutes, and was then passed through a second zone whose temperature had been set to 160° C. in 30 minutes. Thus, a vulcanized elastic roller 2 was obtained.

Next, both ends of the elastic layer portion (rubber portion) of the elastic roller 2 before surface grinding were cut so that the elastic layer portion had a width in the axial direction of 232 mm. After that, the surface of the elastic layer portion was ground with a rotary grindstone (number of revolutions of a workpiece: 333 rpm, number of revolutions of the grindstone: 2,080 rpm, grinding time: 12 seconds). Thus, an elastic roller 3 (elastic roller after the surface grinding) was obtained. The elastic roller 3 was of a crown shape having a diameter at each end of 8.26 mm and a diameter at the central portion of 8.50 mm, and its surface had a ten-point average roughness (Rz) of 5.5 μm, a runout of 18 μm, and a hardness of 73° (Asker C).

The ten-point average roughness (Rz) was measured in conformity with JIS B 0601 (1994). The runout was measured with a high-accuracy laser measuring machine LSM-430v manufactured by Mitutoyo Corporation. Specifically, outer diameters were measured with the measuring machine, and then a difference between the maximum outer diameter and the minimum outer diameter was defined as an outer diameter difference runout. The measurement was performed at five points, and then the average of the outer diameter difference runouts at the five points was defined as the runout of the product subjected to the measurement. The Asker C hardness was measured under an environment having a temperature of 25° C. and a relative humidity of 55% RH, and under the condition of a load of 1,000 g by bringing the indenter point of an Asker C type hardness meter (manufactured by Kobunshi Keiki Co., Ltd.) into abutment with the surface of the measuring object.

<Formation of Surface Layer>

The respective paints 1-1 to 1-7 for forming surface layers were applied to the peripheral surfaces of the elastic layers of the seven elastic rollers 3 by ring application (discharge amount: 0.120 ml/s, moving speed of a ring portion with respect to each elastic roller: 85 mm/s, total discharge amount: 0.130 ml). Next, the coating film of each paint for a surface layer was irradiated with UV light having a wavelength of 254 nm so that an integral light quantity was 9,000 mJ/cm$^2$. Thus, the coating film was cured, and as a result, a surface layer was formed. Thus, charging rollers 1-1 to 1-7 were obtained.

It should be noted that a low-pressure mercury lamp (manufactured by HARISON TOSHIBA LIGHTING Corporation) was used for the application of the UV light. The resultant charging rollers 1-1 to 1-7 were subjected to the following evaluations.

Evaluation 4

The external appearances of the surfaces of the charging rollers 1-1 to 1-7 were visually observed, and then the surfaces were evaluated for their application properties by the following criteria. Table 10 shows the results.

A: The surface of the charging roller is completely free of any coating failure.
B: A coating failure occurred in part of the surface of the charging roller.
C: A coating failure occurred in the entire region of the surface of the charging roller.

Evaluation 5

The thicknesses of the surface layers of the charging rollers 1-1 to 1-7 were measured. A section of each of the resultant charging rollers was subjected to measurement with a scanning transmission electron microscope (STEM, product name: HD-2000, manufactured by Hitachi High-Technologies Corporation). Table 10 shows the results.

Evaluation 6

The charging rollers 1-1 to 1-7 were each incorporated into a process cartridge for supporting the charging roller integrally with a photosensitive member. At this time, a total load to be applied to the charging roller was set to 1 kg. After that, the process cartridge was left to stand under a high temperature and a high humidity (temperature: 40° C., humidity: 95% RH) for 30 days. Next, the process cartridge was left to stand under a normal temperature and a normal humidity (temperature: 25° C., humidity: 50% RH) for 72 hours. The process cartridge was mounted on a laser beam printer (trade name: Color LaserJet 4700 Printer, manufactured by Hewlett-Packard Company) capable of outputting A4-sized paper in a longitudinal direction, and then a black solid image was output as an electrophotographic image.

It should be noted that the development mode of the laser beam printer is a reversal development mode, and the laser beam printer outputs a transfer material at a speed of 164 mm/s and has an image resolution of 600 dpi. In addition, the photosensitive member is an organic electrophotographic photosensitive member having an organic photosensitive layer having a thickness of 19.0 μm on a base. Here, the organic photosensitive layer is a laminated photosensitive layer obtained by laminating a charge-generating layer and a charge-transporting layer containing a modified polycarbonate (binder resin) from the side of the base. Accordingly, the charge-transporting layer serves as the surface layer of the electrophotographic photosensitive member.

In addition, toner used in the laser beam printer is the so-called polymerized toner, and has a glass transition temperature of 63° C. and a volume-average particle diameter of 6 μm. The polymerized toner contains toner particles obtained by externally adding silica fine particles and titanium oxide fine particles to particles obtained by subjecting a polymerizable monomer system containing a wax, a charge control agent, a dye, styrene, butyl acrylate, and an ester monomer to suspension polymerization in an aqueous medium.

The resultant electrophotographic image was evaluated for the presence or absence of the occurrence of a horizontal streak resulting from a trade of the charging roller due to its abutment with the photosensitive member, and when the streak was occurring, for the density and length of the streak by criteria shown in Table 4 below. The criteria shown in Table 4 are based on the length of a streak in a horizontal direction when a streak having width of about 1 mm on A4 vertical paper is of interest.

TABLE 4

| Evaluation rank | Criterion |
|---|---|
| 5 | No streak can be observed on the image. |
| 4.5 | Nearly no streak can be observed on the image. |
| 4 | A streak can be slightly observed at an end of the image, and has a length of about 4 to 5 mm. |
| 3.5 | A streak can be observed at an end of the image, and has a length of 5 mm or more and less than 15 mm. |
| 3 | A streak can be observed at an end of the image, and has a length of 15 mm or more and less than 30 mm. |
| 2 | A streak can be observed on the image, and has a length of 30 mm or more and less than 70 mm. |
| 1 | A streak can be observed and has a length of 70 mm or more. |

Examples 2 to 19

<Preparation of Condensates 2 to 19>

Condensate intermediates 2 to 11 were prepared in the same manner as in the condensate intermediate 1 except that the raw materials to be used and their amounts were changed as shown in Table 5. It should be noted that Table 6 shows compound species represented by the abbreviations for the raw materials in Table 5.

TABLE 5

| Condensate intermediate No. | Hydrolyzable silane compound (A) | | | | | Hydrolyzable silane compound (B) | | $H_2O$ (g) | EtOH (g) | Ror |
|---|---|---|---|---|---|---|---|---|---|---|
| | EP-1 (g) | EP-2 (g) | EP-3 (g) | EP-4 (g) | EP-5 (g) | He (g) | Ph (g) | | | |
| 1 | 11.56 | — | — | — | — | 62.11 | — | 11.34 | 91.87 | 1.8 |
| 2 | 69.97 | — | — | — | — | — | — | 9.61 | 97.26 | 1.8 |
| 3 | 38.35 | — | — | — | — | 33.53 | — | 10.53 | 94.22 | 1.8 |
| 4 | 11.76 | — | — | — | — | 41.14 | 25.67 | 11.53 | 86.76 | 1.8 |
| 5 | 11.56 | — | — | — | — | 62.11 | — | 3.78 | 99.43 | 0.6 |
| 6 | 11.56 | — | — | — | — | 62.11 | — | 22.68 | 80.53 | 3.6 |
| 7 | — | 9.84 | — | — | — | 64.95 | — | 11.86 | 90.27 | 1.8 |
| 8 | — | — | 13.01 | — | — | 59.72 | — | 10.90 | 93.18 | 1.8 |
| 9 | — | — | — | 11.93 | — | 61.40 | — | 11.21 | 92.11 | 1.8 |
| 10 | — | — | — | — | — | 62.11 | — | 11.34 | 89.82 | 1.8 |
| 11 | 5.75 | — | — | — | — | 61.76 | — | 11.28 | 91.99 | 1.8 |

TABLE 6

| | |
|---|---|
| EP-1 | 3-Glycidoxypropyltrimethoxysilane (trade name: KBM403, manufactured by Shin-Etsu Chemical Co., Ltd.) |
| EP-2 | 4-(1,2-Epoxybutyl)trimethoxysilane (manufactured by Carbon Scientific) |
| EP-3 | 8-Oxirane-2-yloctyltrimethoxysilane (manufactured by SiKEMIA) |
| EP-4 | 1-(3,4-Epoxycyclohexyl)ethyltrimethoxysilane (trade name: KBM303, manufactured by Shin-Etsu Chemical Co., Ltd.) |
| EP-5 | 3-Glycidoxypropyltriethoxysilane (trade name: KBE403, manufactured by Shin-Etsu Chemical Co., Ltd.) |
| He | Hexyltrimethoxysilane (trade name: KBM3063, manufactured by Shin-Etsu Chemical Co., Ltd.) |
| Ph | Phenyltriethoxysilane (trade name: KBE103, manufactured by Shin-Etsu Chemical Co., Ltd.) |
| Ta-1 | Tantalum pentaethoxide (manufactured by Gelest) |
| Ta-2 | Tantalum pentamethoxide (manufactured by Gelest) |
| Ta-3 | Tantalum penta-n-butoxide (manufactured by Gelest) |

Next, condensates 2 to 19 were prepared in the same manner as in the condensate 1 except that the kinds and amounts of the condensate intermediates 2 to 11, and the kinds and amounts of the hydrolyzable tantalum compounds were changed as shown in Table 7 below. It should be noted that Table 6 above shows compound species represented by the abbreviations for the hydrolyzable tantalum compounds (Ta-1 to Ta-3) in Table 7 as well.

TABLE 7

| Condensate No. | Condensate intermediate No. | Usage (g) | Hydrolyzable tantalum compound | | | Ta/Si |
|---|---|---|---|---|---|---|
| | | | Ta-1 (g) | Ta-2 (g) | Ta-3 (g) | |
| 1 | 1 | 98.05 | 78.75 | — | — | 1.00 |
| 2 | 1 | 35.25 | 141.55 | — | — | 5.00 |
| 3 | 1 | 163.65 | 13.15 | — | — | 0.10 |
| 4 | 1 | 51.85 | 124.95 | — | — | 3.00 |
| 5 | 1 | 126.14 | 50.66 | — | — | 0.50 |
| 6 | 1 | 30.38 | 146.42 | — | — | 6.00 |
| 7 | 1 | 169.97 | 6.83 | — | — | 0.05 |
| 8 | 2 | 105.20 | 71.60 | — | — | 1.00 |
| 9 | 3 | 101.21 | 75.59 | — | — | 1.00 |
| 10 | 4 | 97.30 | 79.50 | — | — | 1.00 |
| 11 | 5 | 98.05 | 78.75 | — | — | 1.00 |
| 12 | 6 | 98.05 | 78.75 | — | — | 1.00 |
| 13 | 1 | 106.20 | — | 70.60 | — | 1.00 |
| 14 | 1 | 84.99 | — | — | 91.81 | 1.00 |
| 15 | 7 | 96.10 | 80.70 | — | — | 1.00 |
| 16 | 8 | 99.74 | 77.06 | — | — | 1.00 |
| 17 | 9 | 98.49 | 78.31 | — | — | 1.00 |
| 18 | 10 | 98.05 | 78.75 | — | — | 1.00 |
| 19 | 11 | 98.27 | 78.53 | — | — | 1.00 |

The resultant condensates 2 to 19 were subjected to the evaluation [1] in the same manner as in the condensate 1.

<Preparation of Coating Solutions 2 to 19>

Coating solutions 2 to 19 were prepared in the same manner as in the coating solution 1 except that the condensates 2 to 19 were used. Then, the respective coating solutions were subjected to the evaluations [2] and [3].

<Production of Charging Rollers 2 and 3>

Paints 2-1 to 2-5 and 3-1 to 3-5 for forming surface layers were prepared in the same manner as in Example 1 with the coating solutions 2 and 3. It should be noted that five kinds of solid content concentrations, i.e., 0.1 mass %, 0.2 mass %, 1.0 mass %, 4.0 mass %, and 5.0 mass % were adopted. Charging rollers 2-1 to 2-5 and 3-1 to 3-5 were produced in the same manner as in Example 1 with those paints, and were then subjected to the evaluations [4] to [6].

<Production of Charging Rollers 4 to 7>

Paints 4-1 to 4-3 and 7-1 to 7-3 for forming surface layers were prepared in the same manner as in Example 1 with the coating solutions 4 to 7. It should be noted that three kinds of solid content concentrations, i.e., 0.5 mass %, 1.0 mass %, and 3.5 mass % were adopted. Charging rollers 4-1 to 4-3, 5-1 to 5-3, 6-1 to 6-3, and 7-1 to 7-3 were produced in the same manner as in Example 1 with those paints, and were then subjected to the evaluations [4] to [6].

<Production of Charging Rollers 8 to 19>

Paints 8 to 19 for forming surface layers were prepared in the same manner as in Example 1 with the coating solutions to 19. It should be noted that a solid content concentration of 1.0 mass % was adopted. Charging rollers 8 to 19 were produced in the same manner as in Example 1 with those paints, and were then subjected to the evaluations [4] to [6].

Comparative Examples 1 and 2

<Preparation of Comparative Condensate 20>
A comparative condensate 20 was prepared in the same manner as in the condensate 1 except that composition shown in Table 8 below was adopted. The comparative condensate was subjected to the evaluation [1].

<Preparation of Comparative Coating Solution 20>
A comparative coating solution 20 was prepared in the same manner as in the coating solution 1 except that the comparative condensate 20 was used. The comparative coating solution was subjected to the evaluations [2] and [3].

<Preparation of Comparative Condensate 21>
As shown in Table 8 below, no hydrolyzable silane compound was used, and the hydrolyzable tantalum compound, water, and ethanol were mixed. The mixture was stirred at room temperature for 3 hours. Thus, a comparative condensate 21 was obtained. The comparative condensate was subjected to the evaluation [1].

<Preparation of Comparative Coating Solution 21>
A comparative coating solution 21 was prepared in the sama manner as in the coating solution 1 except that the comparative condensate 21 was used and no photocationic polymerization initiator was added. The comparative coating solution was subjected to the evaluations [2] and [3]. It should be noted that at the time of the evaluations [2] and [3] of the comparative coating solution 21, UV was not used for the curing of the coating film of the comparative coating solution 21, and the curing was performed by heating the coating film at a temperature of 250° C. for 1 hour.

TABLE 8

| Comparative condensate No. | EP1 (g) | $H_2O$ (g) | EtOH (g) | Ta-1 (g) |
|---|---|---|---|---|
| 20 | 69.97 | 9.61 | 97.26 | — |
| 21 | — | 2.02 | 83.81 | 90.93 |

<Production of Charging Rollers 20 and 21>
Charging rollers 20 and 21 were each produced in the same manner as in Example 1 except that the paint 1 for forming a surface layer of Example 1 was changed to the comparative coating solution 20 or 21. Then, the charging rollers were subjected to the evaluations [4] to [6].

Tables 9 to 11 below show the results of the evaluations [1] to [6] of: the condensates 1 to 19, and the comparative condensates 20 and 21; the coating solutions 1 to 19, and the comparative coating solutions 20 and 21; and the charging rollers-1 to 21.

TABLE 9

| | Evaluation 1 | | | | |
|---|---|---|---|---|---|
| Condensate No. | (1) | (2) (Ta—O—Ta)/ [(Si—O—Ta) + (Ta—O—Ta)] | Coating solution No. | Evaluation 2 | Evaluation 3 DC (%) |
| 1 | Present | 0.66 | 1 | A | 59 |
| 2 | Present | 0.79 | 2 | B | 53 |
| 3 | Present | 0.71 | 3 | A | 67 |
| 4 | Present | 0.49 | 4 | A | 56 |
| 5 | Present | 0.85 | 5 | A | 63 |
| 6 | Present | 0.85 | 6 | C | 51 |
| 7 | Present | 0.10 | 7 | A | 67 |
| 8 | Present | 0.75 | 8 | A | 62 |
| 9 | Present | 0.73 | 9 | A | 60 |
| 10 | Present | 0.58 | 10 | A | 57 |
| 11 | Present | 0.61 | 11 | A | 47 |
| 12 | Present | 0.69 | 12 | B | 66 |
| 13 | Present | 0.64 | 13 | A | 56 |
| 14 | Present | 0.68 | 14 | A | 61 |
| 15 | Present | 0.65 | 15 | A | 62 |
| 16 | Present | 0.58 | 16 | A | 57 |
| 17 | Present | 0.64 | 17 | A | 61 |
| 18 | Present | 0.56 | 18 | A | 55 |
| 19 | Present | 0.72 | 19 | A | 60 |
| 20 | Absent | — | 20 | A | 36 |
| 21 | Absent | — | 21 | D | — |

TABLE 10

| Example | Charging roller No. | Evaluation 4 | Evaluation 5 (μm) | Evaluation 6 |
|---|---|---|---|---|
| 1 | 1-1 | A | 0.030 | 5 |
| | 1-2 | A | 0.005 | 3.5 |
| | 1-3 | A | 0.010 | 4 |
| | 1-4 | A | 0.020 | 4.5 |
| | 1-5 | A | 0.090 | 5 |
| | 1-6 | A | 0.100 | 5 |
| | 1-7 | B | 0.150 | 5 |
| 2 | 2-1 | A | 0.005 | 3.5 |
| | 2-2 | A | 0.010 | 4 |
| | 2-3 | A | 0.030 | 5 |
| | 2-4 | A | 0.100 | 5 |
| | 2-5 | B | 0.150 | 5 |
| 3 | 3-1 | A | 0.005 | 3 |
| | 3-2 | A | 0.010 | 3.5 |
| | 3-3 | A | 0.030 | 4 |
| | 3-4 | A | 0.100 | 4.5 |
| | 3-5 | B | 0.150 | 5 |
| 4 | 4-1 | A | 0.020 | 4.5 |
| | 4-2 | A | 0.030 | 5 |
| | 4-3 | A | 0.090 | 5 |
| 5 | 5-1 | A | 0.020 | 4.5 |
| | 5-2 | A | 0.030 | 5 |
| | 5-3 | A | 0.090 | 5 |
| 6 | 6-1 | A | 0.010 | 3.5 |
| | 6-2 | A | 0.030 | 5 |
| | 6-3 | A | 0.100 | 5 |
| 7 | 7-1 | A | 0.010 | 3 |
| | 7-2 | A | 0.030 | 3.5 |
| | 7-3 | A | 0.100 | 3.5 |
| 8 | 8 | A | 0.030 | 5 |
| 9 | 9 | A | 0.030 | 5 |
| 10 | 10 | A | 0.030 | 5 |
| 11 | 11 | A | 0.030 | 4 |
| 12 | 12 | A | 0.030 | 5 |
| 13 | 13 | A | 0.030 | 5 |
| 14 | 14 | A | 0.030 | 5 |
| 15 | 15 | A | 0.030 | 5 |
| 16 | 16 | A | 0.030 | 5 |
| 17 | 17 | A | 0.030 | 5 |
| 18 | 18 | A | 0.030 | 5 |
| 19 | 19 | A | 0.030 | 5 |

TABLE 11

| Comparative Example | Charging roller No. | Evaluation 4 | Evaluation 5 (μm) | Evaluation 6 |
|---|---|---|---|---|
| 1 | 20 | A | 0.030 | 2 |
| 2 | 21 | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority of Japanese Patent Application No. 2010-215809, filed on Sep. 27, 2010, and includes the content thereof by reference as a part of this application.

What is claimed is:

1. A charging member, comprising:

a support;

an elastic layer; and a surface layer, wherein the surface layer comprises a polymer having an Si—O—Ta bond and having a structural unit represented by the following structural formula (1) and a structural unit represented by the following structural formula (2):

$$\left( \begin{array}{c} R_1 - O - R_2 - O \\ | \quad\quad\quad | \\ SiO_{3/2} \quad SiO_{3/2} \end{array} \right) \quad (1)$$

$$TaO_{5/2} \quad (2)$$

in the structural formula (1), $R_1$ and $R_2$ each independently represent any one of the structural formulae (3) to (6):

(3) [structure with $R_3, R_4, R_5, R_6, R_7, (CR_8R_9)_n$, x, 1-x, *]

(4) [structure with $R_{10}, R_{11}, R_{12}, R_{13}, R_{14}, (CR_{15}R_{16})_m, O, (CR_{17}R_{18})_l$, y, 1-y, *]

(5) [cyclic structure with $R_{19}, R_{20}, (CR_{21}R_{22})_p, (CR_{23}R_{24})_q$, **, *]

(6) [cyclic structure with $R_{25}, R_{26}, (CR_{27}R_{28})_r, (CR_{29}R_{30})_s, O, (CR_{31}R_{32})_t$, **, *]

in the structural formulae (3) to (6), $R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms; $R_{21}$, $R_{22}$, $R_{27}$, and $R_{28}$ each independently represent hydrogen, oxygen, an alkoxy group having 1 to 4 carbon atoms, or an alkyl group having 1 to 4 carbon atoms; n, m, l, q, s, and t each independently represent an integer of from 1 to 8; p and r each independently represent an integer of from 4 to 12; x and y each independently represent 0 or 1, and a symbol "*" represents a bonding position to a silicon atom in the structural formula (1), and a symbol "**" represents a bonding position to an oxygen atom in the structural formula (1).

2. The charging member according to claim 1, wherein $R_1$ and $R_2$ in the structural formula (1) each independently represent any one selected from the group consisting of the following structural formulae (7) to (10):

(7) [structure with $H_2C$, CH, $(CH_2)_N$, x', 1-x', **, *]

(8) [structure with $H_2C$, CH, $(CH_2)_M$, O, $(CH_2)_L$, y', 1-y', **, *]

(9) [cyclohexane structure with $(CH_2)_Q$, **, *]

-continued

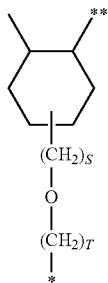

(10)

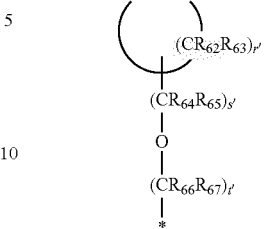

(16)

in the structural formulae (7) to (10), N, M, L, Q, S, and T each independently represent an integer of from 1 to 8; x' and y' each independently represent 0 or 1; and a symbol "*" represents a bonding position to a silicon atom in the structural formula (1), and a symbol "**" represents a bonding position to an oxygen atom in the structural formula (1).

3. The charging member according to claim 1, wherein a ratio (Ta/Si) between the numbers of tantalum atoms and silicon atoms in the polymer is from 0.1 to 5.0.

4. The charging member according to claim 1, wherein the polymer comprises a crosslinked product of a hydrolyzed condensate of a hydrolyzable silane compound represented by the following structural formula (11) and a hydrolyzable tantalum compound represented by the following structural formula (12):

 (11)

 (12)

in the structural formula (11), $R_{33}$ represents any one of the following structural formulae (13) to (16), $R_{34}$ to $R_{36}$ each independently represent an alkyl group having 1 to 4 carbon atoms, and in the structural formula (12), $R_{37}$ to $R_{41}$ each independently represent an alkyl group having 1 to 9 carbon atoms:

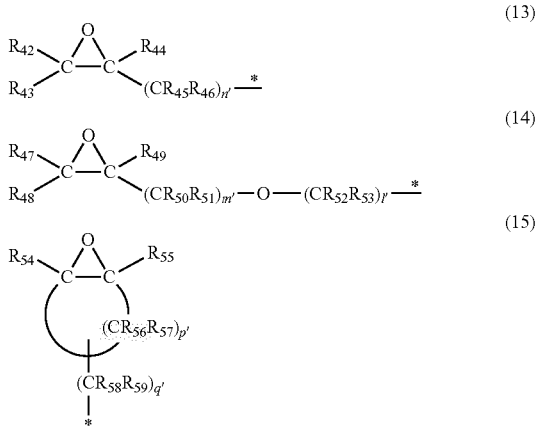

in the structural formulae (13) to (16), $R_{42}$ to $R_{44}$, $R_{47}$ to $R_{49}$, $R_{54}$, $R_{55}$, $R_{60}$ and $R_{61}$ each independently represent hydrogen, an alkyl group having 1 to 4 carbon atoms, a hydroxyl group, a carbonyl group, a carboxyl group, a chlorocarbonyl group, or an amino group; $R_{45}$, $R_{46}$, $R_{50}$ to $R_{53}$, $R_{58}$, $R_{59}$, and $R_{64}$ to $R_{67}$ each independently represent hydrogen or an alkyl group having 1 to 4 carbon atoms; $R_{56}$, $R_{57}$, $R_{62}$, and $R_{63}$ each independently represent hydrogen, an alkoxy group having 1 to 4 carbon atoms, or an alkyl group having 1 to 4 carbon atoms; n', m', l', q', s', and t' each independently represent an integer of from 1 to 8; p' and r' each independently represent an integer of from 4 to 12; and a symbol "*" represents a bonding position to a silicon atom in the structural formula (11).

5. The charging member according to claim 4, wherein the polymer comprises a crosslinked product of a hydrolyzed condensate of the hydrolyzable silane compound represented by the structural formula (11), the hydrolyzable tantalum compound represented by the structural formula (12), and a hydrolyzable silane compound represented by a structural formula (17):

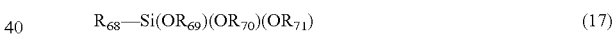 (17)

in the structural formula (17), $R_{68}$ represents an alkyl group having 1 to 21 carbon atoms or a phenyl group, and $R_{69}$ to $R_{71}$ each independently represent an alkyl group having 1 to 6 carbon atoms.

6. A process cartridge, comprising:
the charging member according to claim 1; and
an electrophotographic photosensitive member placed to abut the charging member, wherein
the process cartridge is detachably mountable to a main body of an electrophotographic apparatus.

7. An electrophotographic apparatus, comprising:
the charging member according to claim 1; and
an electrophotographic photosensitive member placed to abut the charging member.

* * * * *